(12) United States Patent
Uejima

(10) Patent No.: US 10,135,486 B2
(45) Date of Patent: Nov. 20, 2018

(54) HIGH-FREQUENCY FRONT-END CIRCUIT

(71) Applicant: Murata Manufacturing Co., Ltd., Kyoto (JP)

(72) Inventor: Takanori Uejima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/830,363

(22) Filed: Dec. 4, 2017

(65) Prior Publication Data

US 2018/0097540 A1   Apr. 5, 2018

Related U.S. Application Data

(63) Continuation of application No. PCT/JP2016/066102, filed on Jun. 1, 2016.

(30) Foreign Application Priority Data

Jun. 3, 2015  (JP) .................................. 2015-112737

(51) Int. Cl.
*H04B 1/44* (2006.01)
*H04B 1/40* (2015.01)
*H04B 1/525* (2015.01)

(52) U.S. Cl.
CPC .................... *H04B 1/525* (2013.01)

(58) Field of Classification Search
CPC ... H04B 1/16; H04B 1/40; H04B 1/44; H04B 1/48; H04B 1/0053; H04B 1/0057;
(Continued)

(56) References Cited

U.S. PATENT DOCUMENTS 7,729,724 B2 * 6/2010 Rofougaran ............. H04B 1/48
455/102
7,834,813 B2 * 11/2010 Caimi .................... H01Q 9/045
343/745
(Continued)

FOREIGN PATENT DOCUMENTS

JP   2004-32673 A    1/2004
JP   2006-109084 A   4/2006
(Continued)

OTHER PUBLICATIONS

International Search Report for International Application No. PCT/JP2016/066102 dated Aug. 23, 2016.
(Continued)

*Primary Examiner* — Quochien B Vuong
(74) *Attorney, Agent, or Firm* — Pearne & Gordon LLP

(57) ABSTRACT

A high-frequency front-end circuit includes first and second switching circuits, first, second, and third splitters, and first and second lines. The first line is connected to the second splitter. The second line is connected to the third splitter. An adjustment circuit is connected between the first and second lines. The frequency of a harmonic signal of a transmission signal transmitted through the first line has a frequency band that is close to or overlaps the frequency of a reception signal transmitted through the second line. The impedance of the adjustment circuit is set such that a harmonic signal transmitted from the adjustment circuit to the second line and a harmonic signal transmitted from the third splitter to the second line are not in same phase with each other at the connection point between the adjustment circuit and the second line.

20 Claims, 3 Drawing Sheets

(58) Field of Classification Search
CPC ...... H04B 1/006; H04B 1/0475; H04B 1/109; H04B 1/525
USPC .......... 455/78, 82, 83, 552.1, 553.1
See application file for complete search history.

(56) References Cited

U.S. PATENT DOCUMENTS

| | | | | |
|---|---|---|---|---|
| 8,189,613 | B2* | 5/2012 | Uejima | H01P 1/15 |
| | | | | 370/463 |
| 8,467,738 | B2* | 6/2013 | Gorbachov | H01P 1/213 |
| | | | | 455/82 |
| 9,705,557 | B2* | 7/2017 | Saji | H04B 1/44 |
| 2004/0224643 | A1 | 11/2004 | Nakai | |
| 2005/0020297 | A1 | 1/2005 | Axness et al. | |
| 2011/0234295 | A1 | 9/2011 | Uejima et al. | |
| 2013/0063224 | A1 | 3/2013 | Saji | |
| 2013/0242809 | A1 | 9/2013 | Tone et al. | |
| 2014/0329475 | A1 | 11/2014 | Ellä et al. | |

FOREIGN PATENT DOCUMENTS

| | | |
|---|---|---|
| JP | 2006-295530 A | 10/2006 |
| JP | 2007-505591 A | 3/2007 |
| JP | 5136532 B2 | 2/2013 |
| JP | 2013-58990 A | 3/2013 |
| JP | 2013-128161 A | 6/2013 |
| JP | 2014-526847 A | 10/2014 |
| KR | 2007-0012093 A | 1/2007 |
| WO | 2014/119046 A1 | 8/2014 |

OTHER PUBLICATIONS

Written Opinion for International Application No. PCT/JP2016/066102 dated Aug. 23, 2016.

Notification of Preliminary Rejection of Korean Patent Application No. 10-2017-7031154 dated Sep. 12, 2018.

* cited by examiner

HIGH-FREQUENCY FRONT-END CIRCUIT

This is a continuation of International Application No. PCT/JP2016/066102 filed on Jun. 1, 2016 which claims priority from Japanese Patent Application No. 2015-112737 filed on Jun. 3, 2015. The contents of these applications are incorporated herein by reference in their entireties.

BACKGROUND OF THE DISCLOSURE

Field of the Disclosure

The present disclosure relates to a high-frequency front-end circuit that has a separation function and is connected to an antenna that transmits and receives harmonic signals in a plurality of communication bands.

Description of the Related Art

Hitherto, various devices that transmit and receive harmonic signals in a plurality of communication bands by an antenna shared for these harmonic signals have been conceived. Such a device includes a high-frequency front-end circuit having a function to separate the harmonic signals to be transmitted and received by the antenna, per communication band.

As an existing high-frequency front-end circuit, a high-frequency switch module having a configuration to switch a communication band for transmission and reception by a switch, for example, as disclosed in Patent Document 1, has been put into practical use.

Patent Document 1: Japanese Patent No. 5136532

BRIEF SUMMARY OF THE DISCLOSURE

In the case where a switch is used as disclosed in Patent Document 1 and transmission and reception are simultaneously performed in a plurality of communication bands, a circuit configuration shown in FIG. 5 is generally conceived. The case where transmission and reception are simultaneously performed in the plurality of communication bands includes the case where only transmission or only reception is performed in one communication band. FIG. 5 is a circuit diagram of an existing high-frequency front-end circuit.

As shown in FIG. 5, an existing high-frequency front-end circuit 10P includes a first splitter 20, a first switching circuit 31, a second switching circuit 32, a second splitter 41, and a third splitter 42.

The first splitter 20 is connected to an antenna ANT, the first switching circuit 31, and the second switching circuit 32.

The first switching circuit 31 includes a common terminal P10 and selection target terminals P11 to P14. The selection target terminals P11 to P14 are selectively connected to the common terminal P10. The common terminal P10 is connected to the first splitter 20. The selection target terminals P11 to P14 are connected to respective circuits for individual communication bands. In the example in FIG. 5, the selection target terminal P12 is connected to the second splitter 41 for a communication band A.

The second splitter 41 is connected to a first transmission signal input terminal Ptx1 and a first reception signal output terminal Prx1.

The second switching circuit 32 includes a common terminal P20 and selection target terminals P21 to P24. The selection target terminals P21 to P24 are selectively connected to the common terminal P20. The common terminal P20 is connected to the first splitter 20. The selection target terminals P21 to P24 are connected to respective circuits for individual communication bands. In the example in FIG. 5, the selection target terminal P22 is connected to the third splitter 42 for a communication band B.

The third splitter 42 is connected to a second transmission signal input terminal Ptx2 and a second reception signal output terminal Prx2.

Here, in the case where transmission in the communication band A and reception in the communication band B are performed simultaneously, when the frequency of a harmonic signal of a transmission signal in the communication band A is close to or overlaps the frequency (fundamental frequency) of a reception signal in the communication band B, there is a possibility that the harmonic signal of the transmission signal in the communication band A inputted from the first transmission signal input terminal Ptx1 sneaks around to the second reception signal output terminal Prx2.

When this phenomenon occurs, the reception sensitivity for the reception signal in the communication band B deteriorates.

Therefore, it is an object of the present disclosure to provide a high-frequency front-end circuit that is able to inhibit deterioration of reception sensitivity due to simultaneous transmission and reception.

A high-frequency front-end circuit of the present disclosure includes a first switching circuit for a low band, a second switching circuit for a high band, first, second, and third splitters, and first and second lines. A common terminal of the first switching circuit and a common terminal of the second switching circuit are connected to the first splitter. The second splitter is connected to a selection target terminal of the first switching circuit. The third splitter is connected to a selection target terminal of the second switching circuit. The first line is connected to the second splitter and is configured to transmit a transmission signal in a first communication band of the low band. The second line is connected to the third splitter and is configured to transmit a reception signal for a second communication band of the high band. An adjustment circuit is connected between the first line and the second line, and its impedance is set so as to satisfy the following condition. When a harmonic signal of the transmission signal in the first communication band has a frequency band that is close to or overlaps a fundamental frequency of the reception signal for the second communication band, the harmonic signal transmitted from the adjustment circuit to the second line and a harmonic signal transmitted from the third splitter to the second line are not in same phase with each other at a connection point between the adjustment circuit and the second line With this configuration, the harmonic signal (a harmonic signal for cancellation) transmitted from the adjustment circuit to the second line and the harmonic signal (a harmonic signal to be cancelled) transmitted from the third splitter to the second line assuredly weaken each other.

In the high-frequency front-end circuit of the present disclosure, the impedance of the adjustment circuit is preferably set such that the harmonic signal transmitted from the adjustment circuit to the second line and the harmonic signal transmitted from the third splitter to the second line are in opposite phase to each other at the connection point between the adjustment circuit and the second line.

With this configuration, the harmonic signal (the harmonic signal for cancellation) transmitted from the adjustment circuit to the second line and the harmonic signal (the harmonic signal to be cancelled) transmitted from the third splitter to the second line further assuredly weaken each other.

In the high-frequency front-end circuit of the present disclosure, the impedance of the adjustment circuit is preferably set such that the harmonic signal transmitted from the adjustment circuit to the second line and the harmonic signal transmitted from the third splitter to the second line have the same amplitude at the connection point between the adjustment circuit and the second line.

With this configuration, the harmonic signal (the harmonic signal for cancellation) transmitted from the adjustment circuit to the second line and the harmonic signal (the harmonic signal to be cancelled) transmitted from the third splitter to the second line assuredly cancel each other.

In the high-frequency front-end circuit of the present disclosure, the adjustment circuit may include a series circuit of a resistor and an inductor.

With this configuration, the amplitude is adjusted by the resistor, and the phase is adjusted by the inductor. Accordingly, it is possible to easily set the amplitude and the phase of the harmonic signal for cancellation.

In the high-frequency front-end circuit of the present disclosure, the adjustment circuit preferably includes a capacitor connected in parallel with the inductor.

With this configuration, it is possible to further assuredly set the phase of the adjustment circuit to a predetermined value.

In the high-frequency front-end circuit of the present disclosure, a parallel circuit of the inductor and the capacitor has a resonant frequency that is close to or overlaps a fundamental frequency of the transmission signal in the first communication band.

With this configuration, it is possible to more assuredly inhibit the transmission signal in the first communication band from leaking (being transmitted) via the adjustment circuit to the second line.

According to the present disclosure, it is possible to inhibit deterioration of reception sensitivity due to simultaneous transmission and reception.

DETAILED DESCRIPTION OF THE DISCLOSURE

Figure 1:
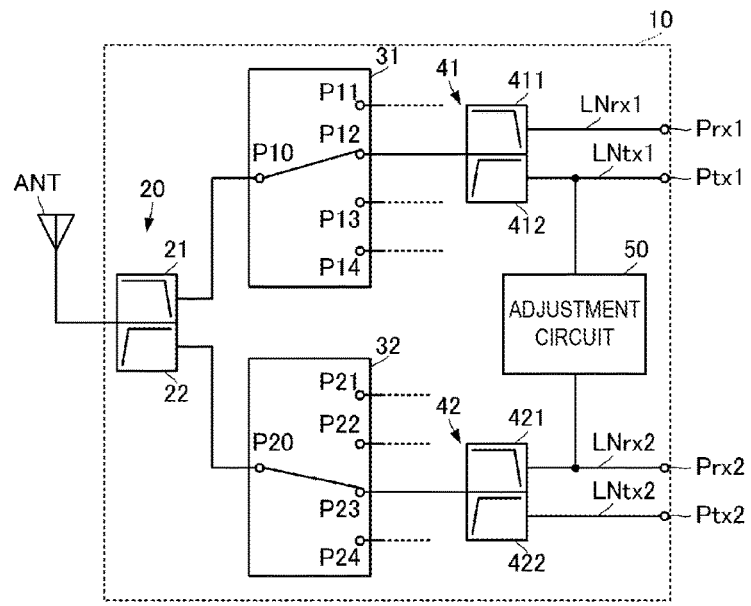
FIG. 1 is a circuit diagram of a high-frequency front-end circuit according to a first embodiment of the present disclosure.

A high-frequency front-end circuit according to a first embodiment of the present disclosure will be described with reference to the drawings. FIG. 1 is a circuit diagram of the high-frequency front-end circuit according to the first embodiment of the present disclosure.

As shown in FIG. 1, the high-frequency front-end circuit 10 includes a first splitter 20, a first switching circuit 31, a second switching circuit 32, a second splitter 41, a third splitter 42, and an adjustment circuit 50.

The first splitter 20 is a so-called diplexer that roughly separates communication bands. The first splitter 20 is composed of a combination of a low pass filter 21 and a high pass filter 22. The first splitter 20 includes a common terminal, a low frequency side terminal, and a high frequency side terminal. The low pass filter 21 is connected between the common terminal and the low frequency side terminal. The high pass filter 22 is connected between the common terminal and the high frequency side terminal.

The common terminal is connected to an external antenna ANT. The low frequency side terminal is connected to a common terminal P10 of the first switching circuit 31. The high frequency side terminal is connected to a common terminal P20 of the second switching circuit 32.

The first splitter 20 transmits a harmonic signal of a frequency band in a low band with low loss between the antenna ANT and the first switching circuit 31 via the low pass filter 21. The first splitter 20 transmits a harmonic signal of a frequency band in a high band with low loss between the antenna ANT and the second switching circuit 32 via the high pass filter 22.

The first switching circuit 31 includes the common terminal P10 and selection target terminals P11 to P14. The selection target terminals P11 to P14 are selectively connected to the common terminal P10.

Transmission/reception circuits for respective communication bands of the low band are connected to the selection target terminals P11 to P14 of the first switching circuit 31, respectively. For example, as shown in FIG. 1, the second splitter 41 for a communication band A of the low band is connected to the selection target terminal P12. Although not shown, circuits similar to the circuit connected to the selection target terminal P12 are connected to the selection target terminals P11, P13, and P14.

The second splitter 41 is a so-called duplexer that separates a transmission signal and a reception signal constituting one communication band. The second splitter 41 is composed of a combination of a low pass filter 411 and a high pass filter 412. The second splitter 41 may be composed of two elastic wave filters having different pass bands, depending on the frequency band of the transmission signal and the reception signal.

The low pass filter 411 is connected between the selection target terminal P12 of the first switching circuit 31 and a first reception signal output terminal Prx1. The low pass filter 411 is connected to the first reception signal output terminal Prx1 via a first reception line LNrx1.

The high pass filter 412 is connected between the selection target terminal P12 of the first switching circuit 31 and a first transmission signal input terminal Ptx1. The high pass filter 412 is connected to the first transmission signal input terminal Ptx1 via a first transmission line (corresponding to a "first line" of the present disclosure) LNtx1.

The second switching circuit 32 includes the common terminal P20 and selection target terminals P21 to P24. The selection target terminals P21 to P24 are selectively connected to the common terminal P20.

Transmission/reception circuits for respective communication bands of the high band are connected to the selection target terminals P21 to P24 of the second switching circuit 32, respectively. For example, as shown in FIG. 1, the third splitter 42 for a communication band B of the high band is connected to the selection target terminal P23. Although not shown, circuits similar to the circuit connected to the selection target terminal P23 are connected to the selection target terminals P21, P22, and p24. The frequencies of the pass bands of the transmission/reception circuits connected to the respective selection target terminals P21 to P24 of the second switching circuit 32 are higher than the frequencies of the pass bands of the transmission/reception circuits connected to the respective selection target terminals P11 to P14 of the first switching circuit 31.

The third splitter 42 is a so-called duplexer that separates a transmission signal and a reception signal constituting one communication band. The third splitter 42 is composed of a combination of a low pass filter 421 and a high pass filter 422. The third splitter 42 may be composed of two elastic wave filters having different pass bands, depending on the frequency band of the transmission signal and the reception signal.

The low pass filter 421 is connected between the selection target terminal P23 of the second switching circuit 32 and a second reception signal output terminal Prx2. The low pass filter 421 is connected to the second reception signal output terminal Prx2 via a second reception line (corresponding to a "second line" of the present disclosure) LNrx2.

The high pass filter 422 is connected between the selection target terminal P22 of the second switching circuit 32 and a second transmission signal input terminal Ptx2. The high pass filter 422 is connected to the second transmission signal input terminal Ptx2 via a second transmission line LNtx2.

Figure 2:
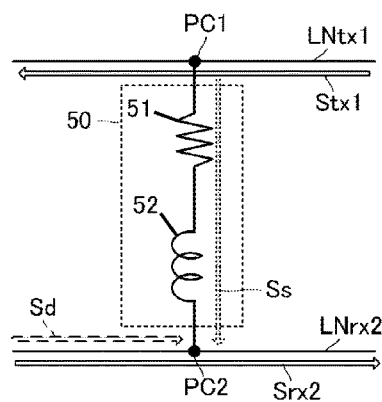
FIG. 2 is a circuit diagram of an adjustment circuit according to the first embodiment of the present disclosure.

The adjustment circuit 50 is connected between the first transmission line LNtx1 and the second reception line LNrx2. FIG. 2 is a circuit diagram of the adjustment circuit according to the first embodiment of the present disclosure. In FIG. 2, lines representing respective signals for explaining the principle of cancellation of harmonic signals by using the adjustment circuit 50 are also shown.

The adjustment circuit 50 includes a resistor 51 and an inductor 52. The resistor 51 and the inductor 52 are connected in series between the first transmission line LNtx1 and the second reception line LNrx2. The connection point between the adjustment circuit 50 and the first transmission line LNtx1 is PC1, and the connection point between the adjustment circuit 50 and the second reception line LNrx2 is PC2.

With such a circuit configuration, the high-frequency front-end circuit 10 is able to achieve the following operation and advantageous effects.

Transmission in the communication band A of the low band and reception in the communication band B of the high band are simultaneously performed. That is, carrier aggregation for transmission in the communication band A and reception in the communication band B is performed. At this time, reception in the communication band A and transmission in the communication band B may not be performed.

In this case, in the first switching circuit 31, the common terminal P10 and the selection target terminal P12 are connected to each other. In the second switching circuit 32, the common terminal P20 and the selection target terminal P23 are connected to each other.

A transmission signal Stx1 in the communication band A is inputted from the first transmission signal input terminal Ptx1 and transmitted via the first transmission line LNtx1, the second splitter 41, the first switching circuit 31, and the first splitter 20 to the antenna ANT.

A reception signal Srx2 in the communication band B is inputted from the antenna ANT (received by the antenna ANT) and transmitted via the first splitter 20, the second switching circuit 32, the third splitter 42, and the second reception line LNrx2 to the second reception signal output terminal Prx2.

Here, when the frequency of a harmonic signal of the transmission signal Stx1 in the communication band A is close to or overlaps the frequency (fundamental frequency) of the reception signal Srx2 in the communication band B, the harmonic signal of the transmission signal Stx1 in the communication band A is transmitted via the third splitter 42 to the second reception line LNrx2. This is a harmonic signal Sd to be cancelled shown in FIG. 2.

This is due to, for example, a harmonic signal of the transmission signal Stx1 in the communication band A leaking between the low pass filter 21 and the high pass filter 22 in the first splitter 20 and a harmonic signal of the transmission signal Stx1 in the communication band A reflected by the antenna ANT, and the like.

In addition, a harmonic signal of the transmission signal Stx1 in the communication band A is transmitted from the first transmission line LNtx1 via the adjustment circuit 50 to the second reception line LNrx2. This is a harmonic signal Ss for cancellation shown in FIG. 2.

Here, the impedance of the adjustment circuit 50, that is, the resistance value R of the resistor 51, and the inductance L of the inductor 52 are set as described next.

(Resistance Value R of Resistor 51)

The resistance value R of the resistor 51 is set such that the amplitude of the harmonic signal Sd to be cancelled is substantially equal to the amplitude of the harmonic signal Ss for cancellation. Particularly, the resistance value R of the resistor 51 is preferably set such that the amplitude of the harmonic signal Sd to be cancelled is equal to the amplitude of the harmonic signal Ss for cancellation.

(Inductance L of Inductor 52)

The inductance L of the inductor 52 is set such that the harmonic signal Sd to be cancelled and the harmonic signal Ss for cancellation are not in same phase with each other at the connection point PC2. Particularly, the inductance L of the inductor 52 is preferably set such that the harmonic signal Sd to be cancelled and the harmonic signal Ss for cancellation are in opposite phase to each other at the connection point PC2.

Due to such a configuration, the harmonic signal Sd to be cancelled and the harmonic signal Ss for cancellation weaken each other, whereby it is possible to suppress the harmonic signal to be transmitted to the second reception signal output terminal Prx2. Particularly, since the amplitude of the harmonic signal Sd to be cancelled and the amplitude of the harmonic signal Ss for cancellation are equal to each other, and the harmonic signal Sd to be cancelled and the harmonic signal Ss for cancellation are in opposite phase to each other at the connection point PC2, it is possible to cancel the harmonic signal Sd to be cancelled and the harmonic signal Ss for cancellation. Accordingly, it is possible to eliminate the harmonic signal to be transmitted to the second reception signal output terminal Prx2.

Due to such a configuration, it is possible to inhibit deterioration of the reception sensitivity at the second reception signal output terminal Prx2 for the reception signal Srx2 in the communication band B.

The resistor 51 and the inductor 52 may be components mounted on a circuit board or may be conductor patterns formed on a circuit board. However, when mounting components are used as the resistor 51 and the inductor 52, the resistor 51 and the inductor 52 are easily replaceable. Therefore, it is possible to easily perform an operation of setting the adjustment circuit 50 to the desired impedance, and it is possible to easily change or adjust the adjustment circuit 50 even after circuit formation.

Figure 3:
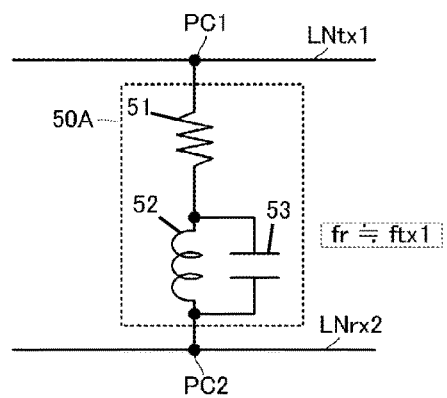
FIG. 3 is a circuit diagram of an adjustment circuit according to a second embodiment of the present disclosure.

Next, a high-frequency front-end circuit according to a second embodiment will be described with reference to the drawing. FIG. 3 is a circuit diagram of an adjustment circuit of the high-frequency front-end circuit according to the second embodiment of the present disclosure.

The high-frequency front-end circuit according to the present embodiment is different from the high-frequency front-end circuit 10 according to the first embodiment in the configuration of an adjustment circuit 50A.

The adjustment circuit 50A includes a resistor 51, an inductor 52, and a capacitor 53.

The resistor 51 and the inductor 52 are connected in series between the first transmission line LNtx1 and the second reception line LNrx2. The capacitor 53 is connected in parallel with the inductor 52.

Therefore, the adjustment circuit 50A is composed of a parallel resonant circuit of the inductor 52 and the capacitor 53 and a series circuit of the inductor 52 and the resistor 51.

The resistance value R of the resistor 51 is set in the same principle as in the first embodiment.

The inductance L of the inductor 52 and the capacitance C of the capacitor 53 are set as follows.

The inductance L of the inductor 52 and the capacitance C of the capacitor 53 are set such that the harmonic signal Sd to be cancelled and the harmonic signal Ss for cancellation are not in same phase with each other at the connection point PC2. Particularly, the inductance L of the inductor 52 and the capacitance C of the capacitor 53 are preferably set such that the harmonic signal Sd to be cancelled and the harmonic signal Ss for cancellation are in opposite phase to each other at the connection point PC2.

Furthermore, the resonant frequency fr of the parallel resonant circuit of the inductor 52 and the capacitor 53 is substantially equal to the frequency ftx1 of the transmission signal Stx1 in the communication band A.

Due to such a configuration, it is possible to inhibit the above-described harmonic signal of the transmission signal Stx1 in the communication band A from leaking to the second reception signal output terminal Prx2, and it is possible to inhibit the transmission signal Stx1 from leaking to the second reception signal output terminal Prx2.

Accordingly, it is possible to inhibit deterioration of the reception sensitivity in the communication band B, and it is possible to inhibit breakage of a subsequent circuit due to flow of the transmission signal Stx1 thereinto.

Even when the resonant frequency fr is not equal to the frequency ftx1 of the transmission signal Stx1, at least if a phase shift by which the above-described harmonic signals weaken each other is achieved, it is only necessary to set the inductance L of the inductor 52 and the capacitance C of the capacitor 53 as appropriate. In this case, a wider phase shift becomes possible by using the inductor 52 and the capacitor 53 than by using only the inductor 52. Therefore, it is possible to assuredly set a desired phase shift amount.

Figure 4:
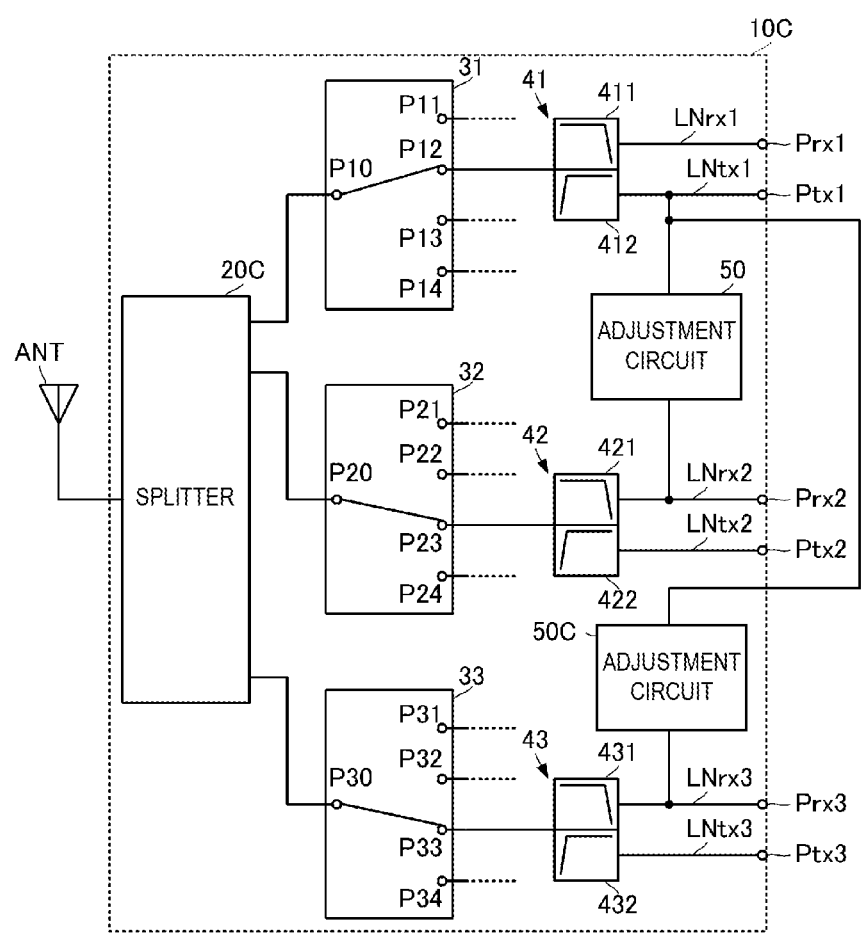
FIG. 4 is a circuit diagram of a high-frequency front-end circuit according to a third embodiment of the present disclosure.
Figure 5:
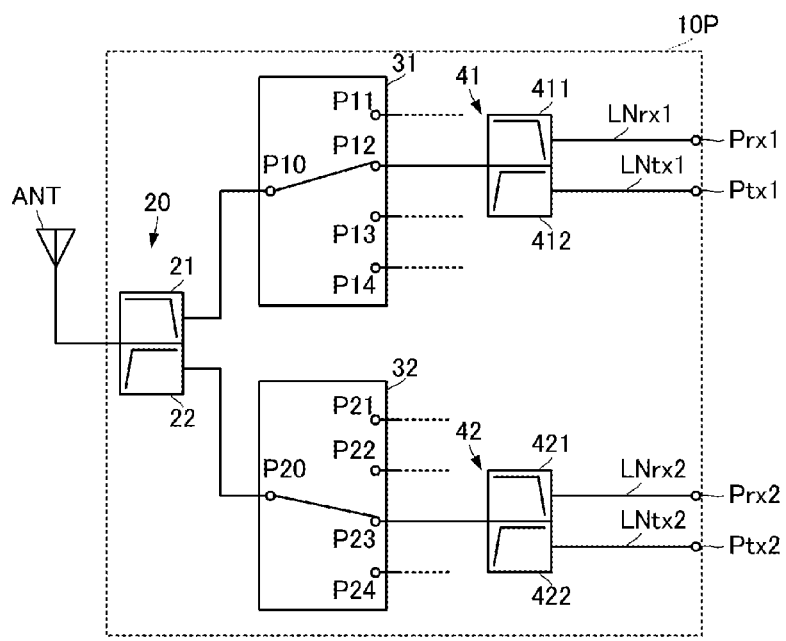
FIG. 5 is a circuit diagram of an existing high-frequency front-end circuit.

Next, a high-frequency front-end circuit according to a third embodiment of the present disclosure will be described with reference to the drawing. FIG. 4 is a circuit diagram of the high-frequency front-end circuit according to the third embodiment of the present disclosure.

The high-frequency front-end circuit 10C according to the present embodiment is different from the high-frequency front-end circuit 10 according to the first embodiment in the configuration of a first splitter 20C due to addition of a third switching circuit 33, a fourth splitter 43, and an adjustment circuit 50C.

The first splitter 20C separates three frequency bands. For example, the first splitter 20C separates a low band, a middle band, and a high band. The first splitter 20C is connected to the first switching circuit 31, the second switching circuit 32, and the third switching circuit 33.

The third switching circuit 33 includes a common terminal P30 and selection target terminals P31 to P34. The selection target terminals P31 to P34 are selectively connected to the common terminal P30.

Transmission/reception circuits for respective communication bands of the middle band are connected to the selection target terminals P31 to P34 of the second switching circuit 32, respectively. For example, as shown in FIG. 4, the fourth splitter 43 for a communication band C of the middle band is connected to the selection target terminal P33. Although not shown, circuits similar to the circuit connected to the selection target terminal P33 are connected to the selection target terminals P31, P32, and P34.

The fourth splitter 43 is a so-called duplexer that separates a transmission signal and a reception signal constituting one communication band. The fourth splitter 43 is composed of a combination of a low pass filter 431 and a high pass filter 432. The fourth splitter 43 may be composed of two elastic wave filters having different pass bands, depending on the frequency band of the transmission signal and the reception signal.

The low pass filter 431 is connected between the selection target terminal P33 of the third switching circuit 33 and a third reception signal output terminal Prx3. The low pass filter 431 is connected to the third reception signal output terminal Prx3 via a third reception line LNrx3.

The high pass filter 432 is connected between the selection target terminal P33 of the third switching circuit 33 and a third transmission signal input terminal Ptx3. The high pass filter 432 is connected to the third transmission signal input terminal Ptx3 via a third transmission line LNtx3.

The adjustment circuit 50C is connected between the first transmission line LNtx1 and the third reception line LNrx3.

The impedance of the adjustment circuit 50C is set such that: the amplitude of a harmonic signal of a transmission signal in the communication band A from the fourth splitter 43 is substantially equal to (particularly equal to) the amplitude of a harmonic signal of the transmission signal in the communication band A from the adjustment circuit 50C; and the amplitude of the harmonic signal of the transmission signal in the communication band A from the fourth splitter 43 and the amplitude of the harmonic signal of the transmission signal in the communication band A from the adjustment circuit 50C are not in same phase with (are particularly in opposite phase to) each other at the connection point between the adjustment circuit 50C and the third reception line LNrx3.

Due to such a configuration, even when carrier aggregation for transmission in the communication band A and reception in the communication band C is performed or even when the frequency of the harmonic signal of the transmission signal in the communication band A is close to or overlaps the frequency of a reception signal in the communication band C, it is possible to inhibit deterioration of the reception sensitivity for the reception signal.

As described above, in the present embodiment, even when the harmonic frequency of a transmission signal in one communication band is close to or overlaps the frequencies of reception signals in a plurality of other communication bands, it is possible to inhibit deterioration of the reception sensitivity for the reception signals.

By applying the configuration of the present embodiment, it is possible to connect an adjustment circuit between the second transmission line LNtx2 and the third reception line LNrx3 and inhibit the harmonic signal of the transmission signal inputted from the second transmission signal input terminal Ptx2 from leaking to the third reception signal output terminal Prx3.

In the above-described embodiments, a specific circuit configuration of each splitter has not been described, but in the case of a circuit obtained by combining an inductor and a capacitor, it is possible to reduce the shape of the inductor of the adjustment circuit by intentionally coupling the splitter to the inductor or the capacitor of the adjustment circuit. Accordingly, it is possible to reduce the size of the adjustment circuit, and it is possible to reduce the size of the high-frequency front-end circuit. At this time, by adjusting the coupling amount, it is possible to adjust the characteristics of a filter forming each splitter, and make the splitter have desired characteristics without using an additional inductor or capacitor.

10, 10C high-frequency front-end circuit
20, 20C first splitter
21 low pass filter
22 high pass filter
31 first switching circuit
32 second switching circuit
33 third switching circuit
41 second splitter
42 third splitter
43 fourth splitter
50, 50A, 50C adjustment circuit
51 resistor
52 inductor
53 capacitor
411 low pass filter
412 high pass filter
421 low pass filter
422 high pass filter
431 low pass filter
432 high pass filter

The invention claimed is:

1. A high-frequency front-end circuit comprising:
a first switching circuit for a low band;
a second switching circuit for a high band;
a second splitter connected to a selection terminal of the first switching circuit;
a third splitter connected to a selection terminal of the second switching circuit,
a first line connected to the second splitter and configured to transmit a transmission signal in the low band;
a second line connected to the third splitter and configured to transmit a reception signal in the high band; and
an adjustment circuit connected between the first line and the second line, wherein
a harmonic signal of the transmission signal in the low band has a frequency band that is close to or overlaps a fundamental frequency of the reception signal in the high band, and
an impedance of the adjustment circuit is such that a harmonic signal transmitted from the adjustment circuit to the second line and a harmonic signal transmitted from the third splitter to the second line are not in phase with each other at a node connecting the adjustment circuit and the second line.

2. The high-frequency front-end circuit according to claim 1, wherein the impedance of the adjustment circuit is such that the harmonic signal transmitted from the adjustment circuit to the second line and the harmonic signal transmitted from the third splitter to the second line are in opposite phase to each other at the node connecting the adjustment circuit and the second line.

3. The high-frequency front-end circuit according to claim 2, wherein the impedance of the adjustment circuit is such that the harmonic signal transmitted from the adjustment circuit to the second line and the harmonic signal transmitted from the third splitter to the second line have the same amplitude at the node connecting the adjustment circuit and the second line.

4. The high-frequency front-end circuit according to claim 3, wherein the adjustment circuit includes a resistor and an inductor connected in series.

5. The high-frequency front-end circuit according to claim 4, wherein the adjustment circuit includes a capacitor connected in parallel with the inductor.

6. The high-frequency front-end circuit according to claim 5, wherein the inductor and the capacitor have a resonant frequency that is close to or overlaps a fundamental frequency of the transmission signal in the low band.

7. The high-frequency front-end circuit according to claim 2, wherein the adjustment circuit includes a resistor and an inductor connected in series.

8. The high-frequency front-end circuit according to claim 7, wherein the adjustment circuit includes a capacitor connected in parallel with the inductor.

9. The high-frequency front-end circuit according to claim 8, wherein the inductor and the capacitor have a resonant frequency that is close to or overlaps a fundamental frequency of the transmission signal in the low band.

10. The high-frequency front-end circuit according to claim 1, wherein the adjustment circuit includes a resistor and an inductor connected in series.

11. The high-frequency front-end circuit according to claim 10, wherein the adjustment circuit includes a capacitor connected in parallel with the inductor.

12. The high-frequency front-end circuit according to claim 11, wherein the inductor and the capacitor have a resonant frequency that is close to or overlaps a fundamental frequency of the transmission signal in the low band.

13. The high-frequency front-end circuit according to claim 1, further comprising a first splitter to which a common terminal of the first switching circuit and a common terminal of the second switching circuit are connected.

14. The high-frequency front-end circuit according to claim 1, further comprising:
a third switching circuit for a medium band;
a fourth splitter connected to a selection terminal of the third switching circuit,
a third line connected to the fourth splitter and configured to transmit a reception signal in the medium band; and
a second adjustment circuit connected between the first line and the third line.

15. The high-frequency front-end circuit according to claim 14, wherein:
the frequency band of the harmonic signal of the transmission signal in the low band is close to or overlaps a fundamental frequency of the reception signal in the medium band, and
an impedance of the second adjustment circuit is such that a harmonic signal transmitted from the second adjustment circuit to the third line and a harmonic signal transmitted from the fourth splitter to the third line are not in phase with each other at a node connecting the second adjustment circuit and the third line.

16. The high-frequency front-end circuit according to claim 15, wherein the impedance of the second adjustment circuit is such that the harmonic signal transmitted from the second adjustment circuit to the third line and the harmonic signal transmitted from the fourth splitter to the third line are in opposite phase to each other at the node connecting the second adjustment circuit and the third line.

17. The high-frequency front-end circuit according to claim 16, wherein the impedance of the second adjustment circuit is such that the harmonic signal transmitted from the second adjustment circuit to the third line and the harmonic signal transmitted from the fourth splitter to the third line have the same amplitude at the node connecting the second adjustment circuit and the third line.

18. The high-frequency front-end circuit according to claim 14, wherein the second adjustment circuit includes a resistor and an inductor connected in series.

19. The high-frequency front-end circuit according to claim 18, wherein the second adjustment circuit includes a capacitor connected in parallel with the inductor of the second adjustment circuit.

20. The high-frequency front-end circuit according to claim 19, wherein the inductor and the capacitor of the second adjustment circuit have a resonant frequency that is close to or overlaps a fundamental frequency of the transmission signal in the low band.

* * * * *